Feb. 15, 1966 H. H. ABBOTT 3,235,668

TELEPHONE SWITCHING NETWORK

Filed Aug. 31, 1962

6 Sheets-Sheet 1

INVENTOR
H. H. ABBOTT
BY John C Albrecht
ATTORNEY

Feb. 15, 1966 H. H. ABBOTT 3,235,668
TELEPHONE SWITCHING NETWORK
Filed Aug. 31, 1962
6 Sheets-Sheet 2

INVENTOR
H. H. ABBOTT
BY John C Albrecht
ATTORNEY

Feb. 15, 1966

H. H. ABBOTT 3,235,668

TELEPHONE SWITCHING NETWORK

Filed Aug. 31, 1962

6 Sheets-Sheet 3

INVENTOR
H. H. ABBOTT
BY John C Albrecht
ATTORNEY

INVENTOR
H. H. ABBOTT
BY John C Albrecht
ATTORNEY

Feb. 15, 1966

H. H. ABBOTT 3,235,668

TELEPHONE SWITCHING NETWORK

Filed Aug. 31, 1962

6 Sheets-Sheet 5

INVENTOR
H. H. ABBOTT
BY John C Albrecht
ATTORNEY

INVENTOR
H. H. ABBOTT
BY John C Albrecht
ATTORNEY

United States Patent Office 3,235,668

Patented Feb. 15, 1966

3,235,668

TELEPHONE SWITCHING NETWORK

Henry H. Abbott, Middletown, N.J., assignor to Bell Telephone Laboratories, Incorporated, New York, N.Y., a corporation of New York Filed Aug. 31, 1962, Ser. No. 220,832
19 Claims. (Cl. 179—18)

This invention relates in general to communication switching networks and, more particularly, to the electronic control of an electromechanical crosspoint switching network.

There are a variety of known end marked crosspoint switching networks such as gas tube networks of the type described in Patent 2,684,405 of July 20, 1954, to E. Bruce and H. M. Straube and such as electronic crosspoint switching networks employing PNPN crosspoint devices. In both the gas tube networks and the PNPN networks busy paths are excluded from subsequent selection by means of electrical lockout circuits whose operation depends upon the negative impedance characteristics of the crosspoint devices.

Switching networks are known wherein ferreed switches are employed. Ferreed switches generally comprise reed relays together with hysteretic magnetic material whereby closure of the relay contacts may be controlled by flux paths determined by the remanent state or states of the magnetic material. Such devices have been described in a number of places in the literature including A. Feiner et al. Patent 2,995,637, issued August 8, 1961, and an article "The Ferreed—A New Switching Device," by A. Feiner, C. A. Lovell, T. N. Lowry, and P. G. Ridinger, Bell System Technical Journal, volume 39, No. 1, January 1960, page 1. As used herein the terms ferreed switch or ferreed is intended to apply to devices of the types therein described.

Further such networks are known wherein the ferreed switches are employed in a plurality of stages to provide selective interconnection between lines and between lines and trunks in a telephone switching system. For example, in T. N. Lowry Patent 3,037,085, May 29, 1962, there is disclosed a ferreed circuit arrangement for a switching network in which the ferreeds are connected for differential excitation, as further described in the Lowry patent, the above-mentioned publication, and additionally discussed below. In application Serial No. 206,055, filed June 28, 1962, now W. S. Hayward, Jr., Patent 3,110,772 issued November 12, 1963, there is disclosed a common bus circuit for interconnecting the control conductors of a matrix of ferreed switches, and in T. N. Lowry application Serial No. 205,920, filed June 28, 1962, there is disclosed a crosspoint switching network employing a plurality of stages of ferreed switches and means for controlling the establishment and disestablishment of paths through such a network.

In the aforenoted Lowry application Serial No. 205,920, a record of the availability of the links of the switching network is maintained in an external memory map. Such a memory map may be advantageously employed in a large switching system; however, the routines for finding an available path through interrogation of the memory map are relatively complex and where, as in a small PBX or community dial office, a relatively small number of lines and trunks are to be served by a switching network, the use of a memory map and its attendant access circuitry may be impractical.

The ferreed is an electromechanical device which is particularly suitable for use as a crosspoint device in an electronically controlled switching network. The ferreed is responsive to current pulses of extremely short time duration; of the order generated by electronic control circuitry. However, in that a ferreed device does not exhibit negative impedance characteristics, the use of lockout arrangements in the control of a ferreed network is not possible. It is for this reason that ferreed networks in the past have been associated with a link memory map and attendant access circuitry.

It is a general object of this invention to substantially reduce the common memory, selection, and control circuitry requirements for electronically controlled switching networks.

It is a further object of the invention to eliminate the requirement of a memory map circuit which is separate and distinct from electronically controlled switching networks.

It is another object of the invention to eliminate the requirement of external network access control and logic circuitry in electronically controlled switching networks.

These and other objects of this invention are attained in one specific illustrative embodiment wherein a switching network is arranged in a plurality of switching stages, each stage of which comprises a plurality of ferreed crosspoint arrays. Each of the ferreed crosspoint arrays is similar to the ferreed crosspoint array described in the aforementioned W. S. Hayward, Jr., Patent 3,110,772. The Hayward disclosure is incorporated herein by reference and, although a brief functional description of the ferreed crosspoint array disclosed in the Hayward application is included hereinbelow, further details thereof may be ascertained by reference to the Hayward application.

In one specific structural arrangement of a ferreed switch, as further described in A. L. Blaha et al. application Serial No. 124,723, filed July 17, 1961, Patent 3,075,059 issued January 22, 1963, one or more dry reed contacts are surrounded by a thin sleeve of square loop magnetic material. A magnetic shunt plate positioned at the midpoint of the sleeve separates the sleeve magnetically into two independent halves. When the two halves are magnetized series-aiding, the flux return path is through the reeds, causing them to close. When the two halves are magnetized in series opposition, the flux through the reeds is a minimum, causing the reeds to open. Each end of the sleeve has two windings, one winding having a larger number of turns than the other. The winding with the larger number of turns on one end of the sleeve is connected in series opposition with the winding having the fewer number of turns on the other end of the sleeve. When either of the sets of windings thus formed is energized, the two ends of the sleeve are poled oppositely and the contacts are opened. When the two sets of windings are energized simultaneously with equal currents, the two sleeve ends are poled series-aiding and the contacts are closed.

The basic ferreed crosspoint is arranged in coordinate array to form 8 x 8 switches. Two sets of reed contacts are used to connect tip and ring conductors from one stage of the network to the next. A third set of reed contacts is used to connect a signaling conductor from one stage of the network to the next. The control windings, two per ferreed, are series-connected along the rows and columns of an array. Internal to the array, one end of the control windings of rows and columns forms a common multiple. To close a crosspoint, current is passed in one column and out one row via the common multiple. The crosspoint at the intersection of the row and column closes. At the same time, current passes through one of the two windings of all other ferreeds in the same row and column causing any that are operated to release. This differential method of operation is characterized by the absence of specific crosspoint release operations. Crosspoints are released as a direct result of other crosspoints being closed, and at the same time as the other crosspoints are closed, in accordance with the principles of differential excitation of ferreeds, as referred to above.

Each of the equipments between which connections are established through the switching network has associated therewith a control conductor for applying marking potentials and crosspoint control signals to the network, a signaling conductor for applying link control potentials to the network and transmission conductors for communication purposes. The switching stages of the network are connected by links each of which comprises a control conductor for extending applied marking potentials and crosspoint enabling signals through the network, a signaling conductor for extending applied link control potentials through the network and transmission conductors for providing a communications path through the network. Each ferreed crosspoint device includes contacts for interconnecting signaling conductors and contacts for interconnecting transmission conductors.

The cathodes and anode elements of a three-terminal PNPN device are included in series with the control conductor of each link. The gate element of the PNPN device is connected to the signaling conductor of the link. When a link is idle, the associated PNPN device is connected so as to assume its conductive state in response to marking potentials applied to its anode and cathode. When a link is busy and not available for inclusion in another path, a link control potential applied to the signaling conductor of the busy link inhibits the associated PNPN device from assuming its conductive state. In its nonconductive state, the PNPN device excludes both marking potentials and crosspoint enabling signals from the control lead of the link, thereby precluding the selection or release of the busy link.

Selection of available links for establishing a path through the switching network is accomplished by squentially scanning the possible paths between the equipments to be connected until an idle path is found. A crosspoint enabling signal is then applied to the control lead associated with one of the equipments to be connected. The appropriate crosspoint devices are operated in response to the crosspoint enabling signal, and the communication path between equipments is thereby established.

In accordance with a feature of the invention, the busy or idle condition of a path through a switching network is indicated by the electrical continuity of the control leads of the links of which the path is comprised.

In accordance with another feature of the invention, link selection in the switching network is accomplished by sequentially determining the electrical continuity of the control leads which define the possible paths between a marked input terminal and a marked output terminal.

In accordance with a further feature of the invention, links are selectively excluded from selection in accordance with the potential applied to the signaling conductors thereof.

In accordance with another feature of the invention, links are selectively excluded from release in accordance with the potential applied to the signaling conductors thereof.

In accordance with still another feature of the invention, the control lead of each link includes a unidirectional current device in circuit therewith, which is selectively inhibited from assuming a conductive condition in accordance with the potential applied to the signaling conductor of the link.

In accordance with a still further feature of the invention, the control conductor of each link is electrically isolated from the control conductors of all other links by the aforenoted unidirectional current device, thereby precluding false operation of crosspoint devices over control conductors other than the control conductor of a selected link.

These and other objects and features of this invention will be more readily understood from the following description when read with respect to the drawing, in which:

FIGS. 1, 2, and 3 are a general block diagram of a switching network in accordance with the broad aspects of this invention;

GENERAL DESCRIPTION

Figure 1:
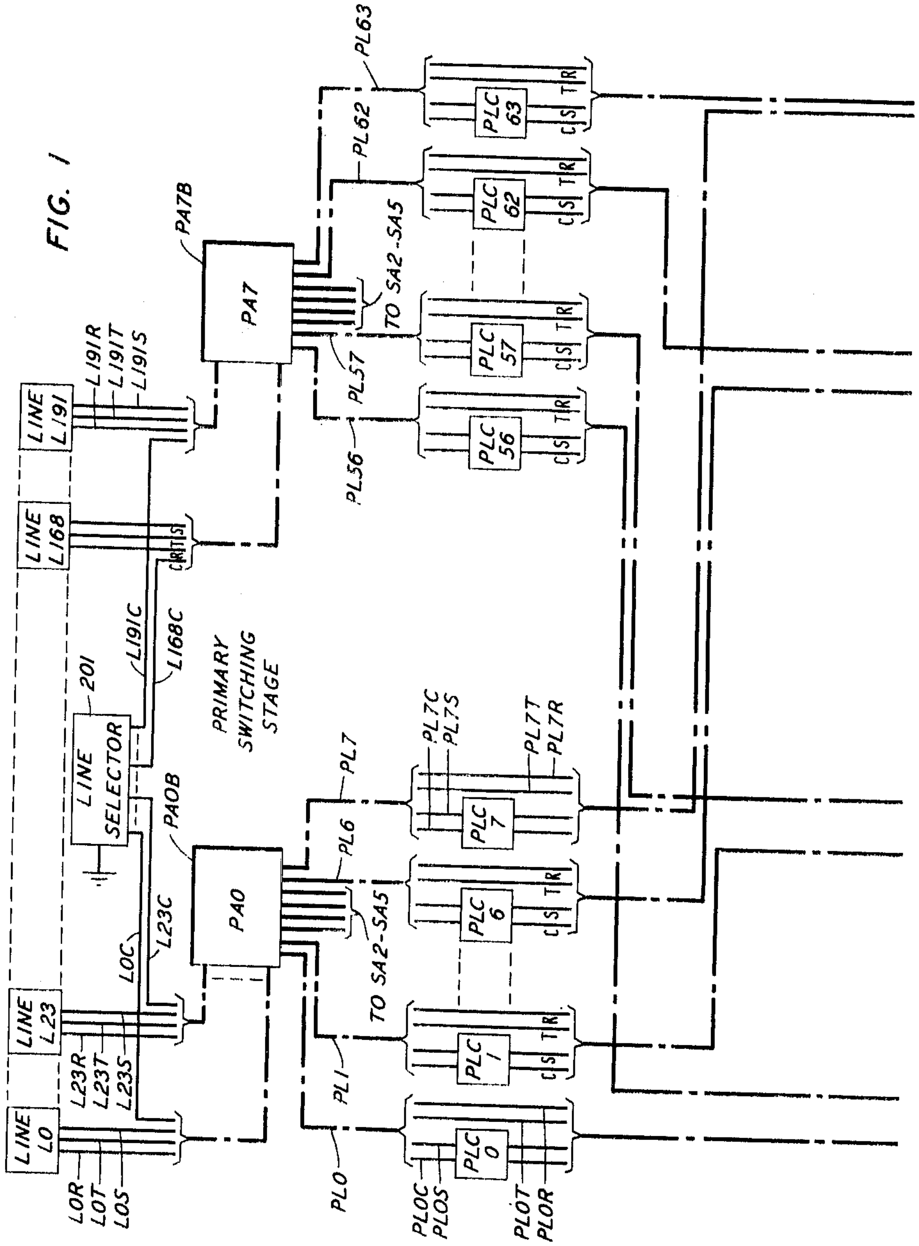
Figure 2:
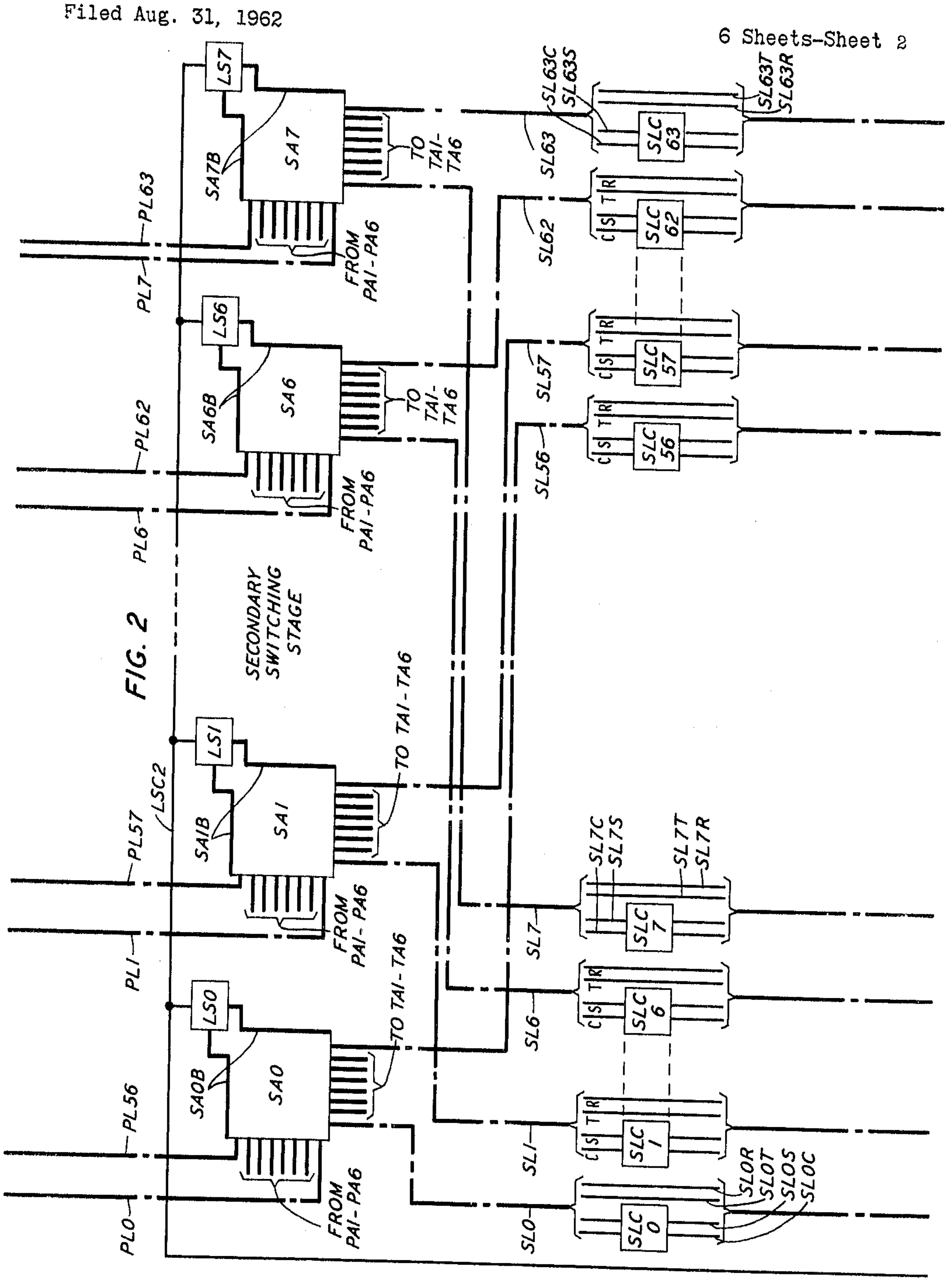
Figure 3:
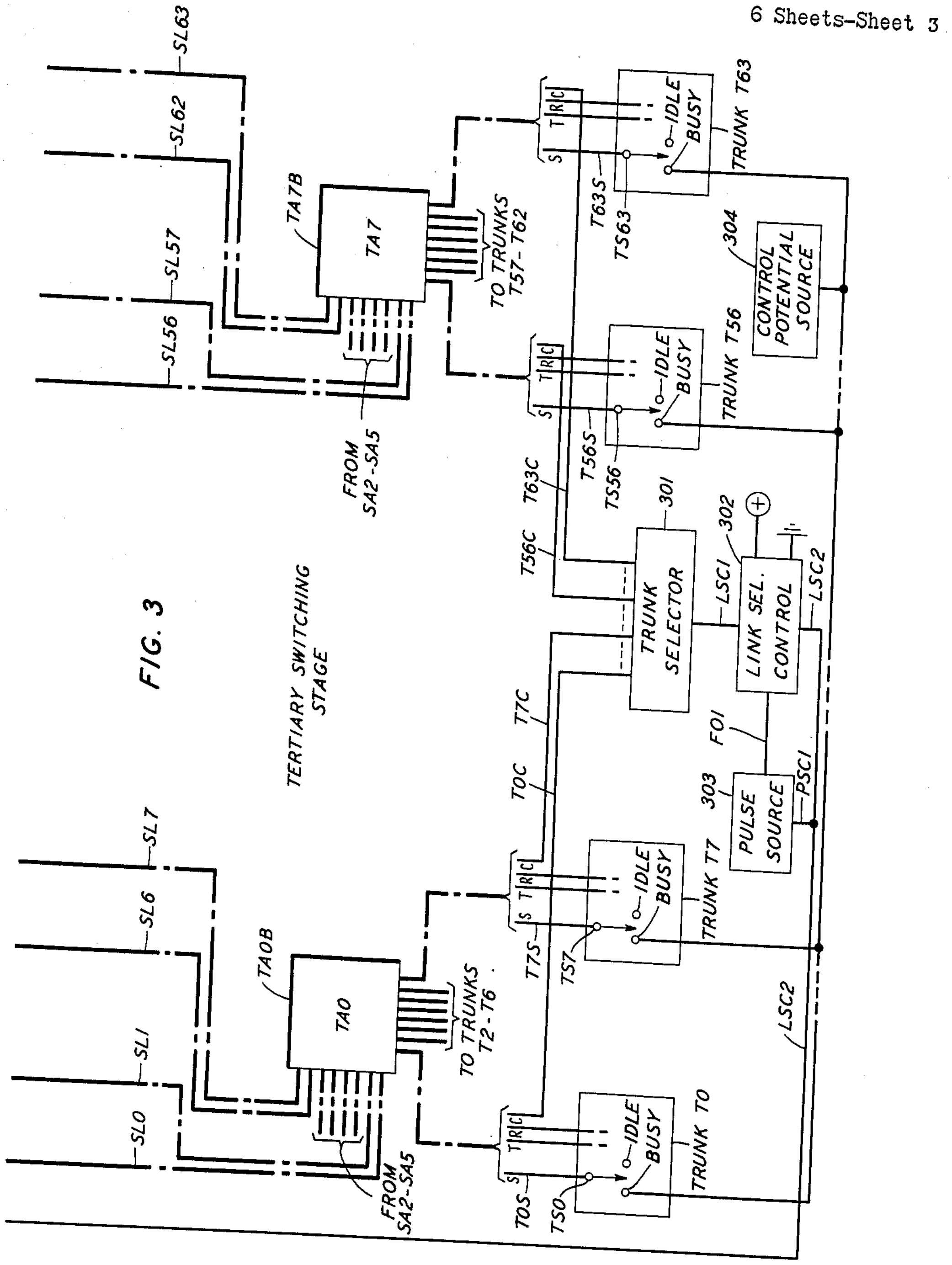

FIGS. 1, 2, and 3 show the general arrangement of one specific illustrative embodiment of the invention. Lines L0–L191 and trunks T0–T63 illustrate equipments between which connections may be established through the switching network. The network is arranged in three switching stages; the first or primary stage (FIG. 1) comprising eight primary crosspoint arrays PA0–PA7, each having twenty-four inputs and eight outputs; the secondary stage (FIG. 2) comprising eight secondary crosspoint arrays SA0–SA7, each having eight inputs and eight outputs; and the third or tertiary stage (FIG. 3) comprising eight tertiary crosspoint arrays TA0–TA7, each having eight inputs and eight outputs.

The primary and secondary switching stages are connected by sixty-four primary links PL0–PL63, which connect the eight outputs of each primary crosspoint array PA0–PA7 to inputs of each secondary crosspoint array SA0–SA7. The primary links PL0–PL63 are so arranged that each primary array PA0–PA7 has one primary link PL0–PL63 connecting it to each secondary array SA0–SA7.

The secondary and tertiary switching stages are connected by sixty-four secondary links, SL0–SL63, which connect the eight outputs of each secondary array SA0–SA7 to inputs of each tertiary array TA0–TA7. The secondary links, SL0–SL63, are arranged similarly to the arrangement of primary links PL0–PL63 in that each secondary array SA0–SA7 has one secondary link SL0–SL63 connecting it to each tertiary array TA0–TA7.

The primary arrays, PA0–PA7, and the tertiary arrays, TA0–TA7, may advantageously be similar to the crosspoint array described in the aforementioned copending patent application Serial No. 206,055 of W. S. Hayward, Jr., now Patent 3,110,772.

Each of the lines L0–L191 (FIG. 1) has associated therewith a control conductor such as L0C, a signaling conductor such as L0S and transmission conductors such as L0T and L0R. Similarly, each of the trunks T0–T63 (FIG. 3) has associated therewith a control conductor such as T0C, a signaling conductor such as T0S and transmission conductors such as T0T and T0R.

Each primary link PL0–PL63 (FIG. 1) is comprised of a control conductor such as PL0C, a signaling conductor such as PL0S, transmission conductors such as PL0T and PL0R and a link control circuit such as PLC0.

Each of the secondary links SL0–SL63 (FIG. 2) is comprised of a control conductor such as SL0C, a signaling conductor such as SL0S, transmission conductors such as SL0T and SL0R, and a link control circuit such as SLC0.

The secondary arrays SA0–SA7, are also similar to the aforementioned ferreed crosspoint array of the Hayward application. However, in departure from the Hayward disclosure, a link selection circuit, such as LS0, is included in series with the common bus SA0B–SA7B of each secondary array SA0–SA7.

Line selector circuit 201 comprises means for selectively applying a marking potential to any of the control conductors L0C–L191C, each of which is associated with one of the lines L0–L191. Trunk selector 301 is similar to line selector 201 and comprises means for selectively extending marking potentials and crosspoint enabling signals from link selector control 302 to any of the control conductors T0C–T63C, each of which is associated with one of the trunks T0–T63. Line selector 201 and trunk selector 301 form no part of the inventive concept of this invention and are therefore not described in detail herein.

*Link selection*

A brief description will now be given of the establishment of a transmission connection through the network. A line, such as line L0, is selected by line selector circuit 201 and a marking ground potential is applied thereby to the control conductor L0C associated with line L0. A trunk, such as trunk T0, is selected by trunk selector circuit 301 and a positive battery marking potential is applied to the control conductor T0C associated with the selected trunk T0. The positive battery marking potential is applied through the link selection control circuit 302, conductor LSC1, and the trunk selector circuit 301 to the control conductor T0C.

Tertiary array TA0, which serves trunk T0, is connectable to each of the secondary arrays SA0–SA7 through secondary links SL0–SL17, respectively. Primary array PA0, which serves line L0, is connectable to each of the secondary arrays SA0–SA7 through primary links PL0–PL7, respectively. There are, therefore, eight possible paths through which trunk T0 and line L0 may be connected. Each of these paths is unique to one of the secondary arrays SA0–SA7.

It is to be noted at this point that, although the specific illustrative embodiment of the invention being described comprises a particular network arrangement of links and crosspoint arrays, the only criteria of the network arrangement of this invention are that one intermediate switching stage of a plurality of switching stages comprises a plurality of crosspoint arrays each of which is unique to one of the possible paths for connecting each input terminal to each output terminal of the network, and that the number of possible paths between an input terminal and an output terminal is equal to the number of crosspoint arrays in that intermediate switching stage.

It is assumed, for this example, that all of the eight possible paths between line L0 and trunk T0 are idle. The link selection circuits LS0–LS7 sequentially examine the paths unique to their associated secondary array, SA0–SA7, respectively. The busy or idle condition of each path is determined by ascertaining whether or not the path is electrically continuous. The first path examined in which current flow is produced responsive to the marking potentials applied to control conductors T0C and L0C is selected for use. Upon locating an idle path, the link selection circuit associated with the secondary array to which the located idle path is unique signals link selector control 302 over conductor LSC2, and the scanning of possible paths is halted. Link selector control 302 signals pulse source 303 to apply a crosspoint enabling signal over conductor F01, through link selector control 302, conductor LSC1, and trunk selector circuit 301, to control conductor T0C. The crosspoint enabling signal is passed through tertiary array TA0 and over the eight control conductors SL0C–SL7C of secondary links SL0–SL7.

Assuming that the path unique to secondary array SA0 has been selected, link selection circuit LS0 completes the circuit of the common bus SA0B of secondary array SA0, thereby permitting the crosspoint enabling signal to pass through secondary array SA0. The common buses SA1B–SA7B of secondary arrays SA1–SA7 remain open. The crosspoint enabling signal generated by pulse source 204 is therefore precluded from passing through secondary arrays SA1–SA7.

The crosspoint enabling signal, which was permitted to pass through secondary array SA0, continues through the control conductor PL0C of primary link PL0, primary array PA0, control conductor L0C of line L0 and the line selector circuit 201 to the previously applied marking ground potential. The crosspoint devices in primary array PA0, secondary array SA0 and tertiary array TA0 which define this selected path are operated in response to the crosspoint enabling signal. Signaling conductors L0S, PL0S, SL0S, and T0S are interconnected by contacts associated with the enabled crosspoint devices. Transmission conductors L0T and L0R, PL0T and PL0R, SL0T and SL0R, and T0T and T0R are also respectively interconnected by contacts associated with the operated crosspoint devices.

The signaling conductors T0S–T63S are connected to busy-idle switches TS0–TS63, respectively, in trunks T0 through T63. Busy-idle switches TS0–TS63 are operated responsive to a busy condition of the trunk T0–T63 associated therewith, which operation may be performed either manually by an operator or automatically by well-known supervisory switching circuitry. When operated, busy-idle switches TS0–TS63 selectively apply a link control potential from link control potential source 304 to signaling conductors T0S–T63S, respectively.

It is assumed that busy-idle switch TS0 in trunk T0 has been operated, either manually or automatically, and that a link control potential has been applied to signaling conductor T0S. This potential is extended through the network over signaling conductors SL0S and PL0S.

Secondary link control circuits SLC0–SLC63 are responsive to a link control potential applied to their associated signaling conductors SL0S–SL63S, respectively, to inhibit current flow in the associated control conductors SL0C–SL63C, respectively. Primary link control circuits PLC0–PLC63 are responsive to the application of link control potential to their associated signaling conductors PL0S–PL63S, respectively, to inhibit current flow through the associated control conductors PL0C–PL63C, respectively.

Primary link control circuit PLC0 and secondary link control circuit SLC0 are therefore responsive to the link control potential applied by busy-idle switch TS0 to signaling conductor T0S to inhibit current flow in control conductors PL0C and SL0C, respectively, thereby excluding marking potentials and crosspoint enabling signals from the selected path. Since the selecting operations performed by the network are dependent upon the electrical continuity of a path through the network, the selection of primary link PL0 and secondary link SL0 for inclusion in subsequent connections is prevented until busy-idle switch TS0 is returned to the idle position and the link control potential is removed from the signaling conductors T0S, SL0S, and PL0S. When a connection has been established between a selected line and a selected trunk, the marking potentials applied by line selector 201 and trunk selector 301 are removed.

As previously described, the ferreed crosspoint devices of the array which define a selected path between an input terminal and an output terminal of the array are enabled responsive to the application of a crosspoint enabling signal to the output terminal when a marking potential of opposite polarity is applied to the input terminal. In this condition, an electrically continuous path is available from the output terminal through the column and row winding sets of the ferreed crosspoint via the common bus, and coincident current will flow through both sets of windings, thereby enabling the ferreed. As further described above, when current flow exists in only one winding set of a ferreed crosspoint, the flux path will cause the contacts of the ferreed to open. Therefore, when marking ground potential is applied to an input terminal other than the input terminal to which a connection was established, the enabled ferreed will be returned to its disabled state in response to the application of a crosspoint enabling signal to the original output terminal.

The above-described exclusion of crosspoint enabling signals from the control conductors PL0C and SL0C prevents the disablement of the associated enabled crosspoint devices in tertiary array TA0, secondary array SA0 and primary array PA0. The connection between trunk T0 and line L0 is therefore precluded from release until current flow in control conductors PL0C and SL0C ceases to be inhibited by link control circuits PLC0 and SLC0.

When the transmission conductors of an established connection are no longer required for use, the busy-idle switch TS0–TS63 of the associated trunk T0–T63 is returned to its idle position either manually or by well-known automatic supervisory switching means.

The return of busy-idle switch TS0 to its idle position removes link control potential from the signaling conductors T0S, L0S, and PL0S of the connection between trunk T0 and line L0. Responsive to the removal of link control potential from signaling conductors TL0S and SL0S, primary and secondary link control circuits TLC0 and SLC0 no longer inhibit current flow through control conductors TL0C and SL0C. Marking potentials and crosspoint enabling signals are therefore permitted to pass over control conductors PL0C and SL0C after link control potential has been removed from signaling conductors TL0S and SL0S. Primary link PL0 and secondary link SL0 are now available for use in establishing subsequent connections through the network.

The contacts associated with the ferreed crosspoint devices which define the now idle connection between line L0 and trunk T0 remain closed. However, the next crosspoint enabling signal applied to either the column or row of ferreed devices in the now idle path will return the enabled crosspoints to their disabled states due to the aforementioned differential operation of the ferreed devices.

DETAILED DESCRIPTION

*The ferreed*

Figure 8:
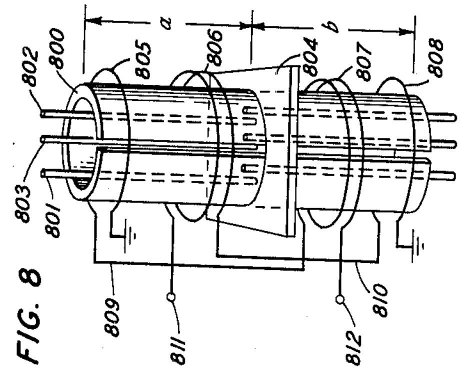
FIG. 8 is a schematic representation of one embodiment of a ferreed crosspoint device.
Figure 10:
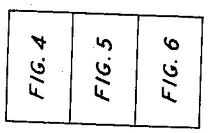
FIG. 10 shows the arrangement of FIGS. 4, 5, and 6.
Figure 9:
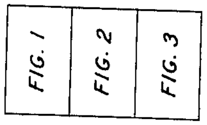
FIG. 9 shows the arrangements of FIGS. 1, 2 and 3.

FIG. 8 shows one embodiment of a ferreed crosspoint device which may be advantageously used with this invention and which is as shown in the above-mentioned Blaha et al. disclosure.

Reed contacts 801, 802, and 803 are surrounded by a magnetic sleeve 800. Shunt plate 804 separates the sleeve 800 into two independent halves *a* and *b*. Windings 805 and 806 surround the upper half *a* of sleeve 800; winding 806 having a larger number of turns than winding 805. Windings 807 and 808 surround the lower half *b* of sleeve 800; winding 807 having a larger number of turns that winding 808. Windings 805 and 807 are connected in series opposition as are windings 806 and 808.

As previously described, when either terminal 811 or terminal 812 is individually energized, the reed contacts 801, 802, and 803 are opened since the two independent halves *a* and *b* of sleeve 800 are poled oppositely. However, when terminals 811 and 812 are simultaneously and equally energized, the two halves *a* and *b* of sleeve 800 are poled series-aiding, and contacts 801, 802, and 803 will be closed.

*The network*

Figure 4:
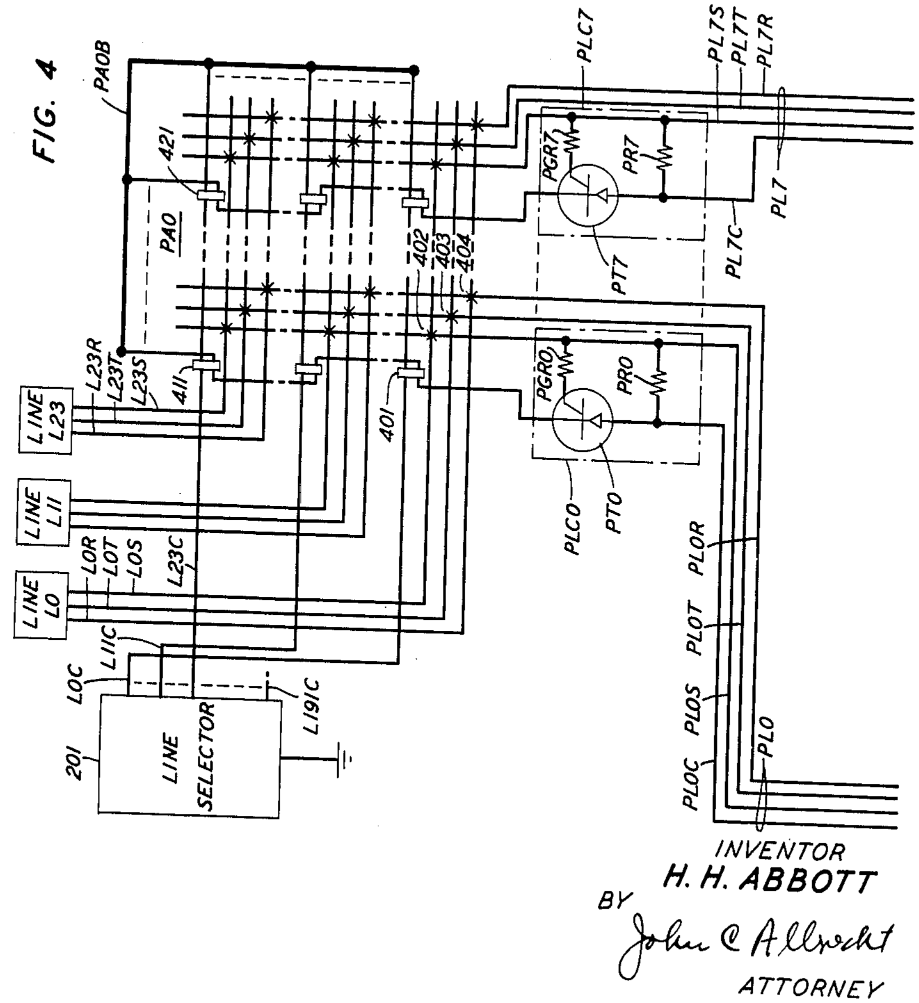
FIGS. 4, 5 and 6 are a schematic representation of one illustrative embodiment of this invention.
Figure 5:
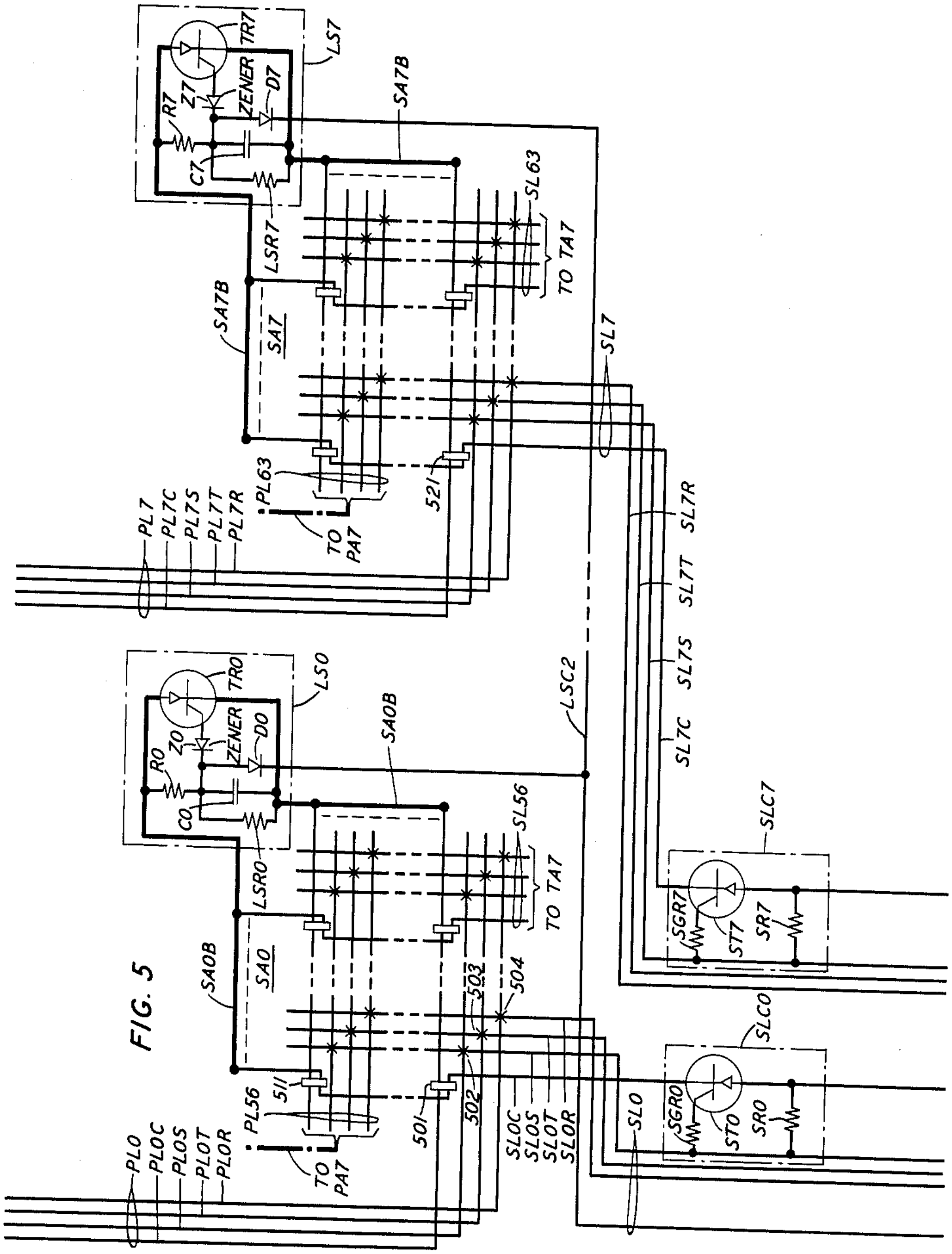
Figures 6, 7:
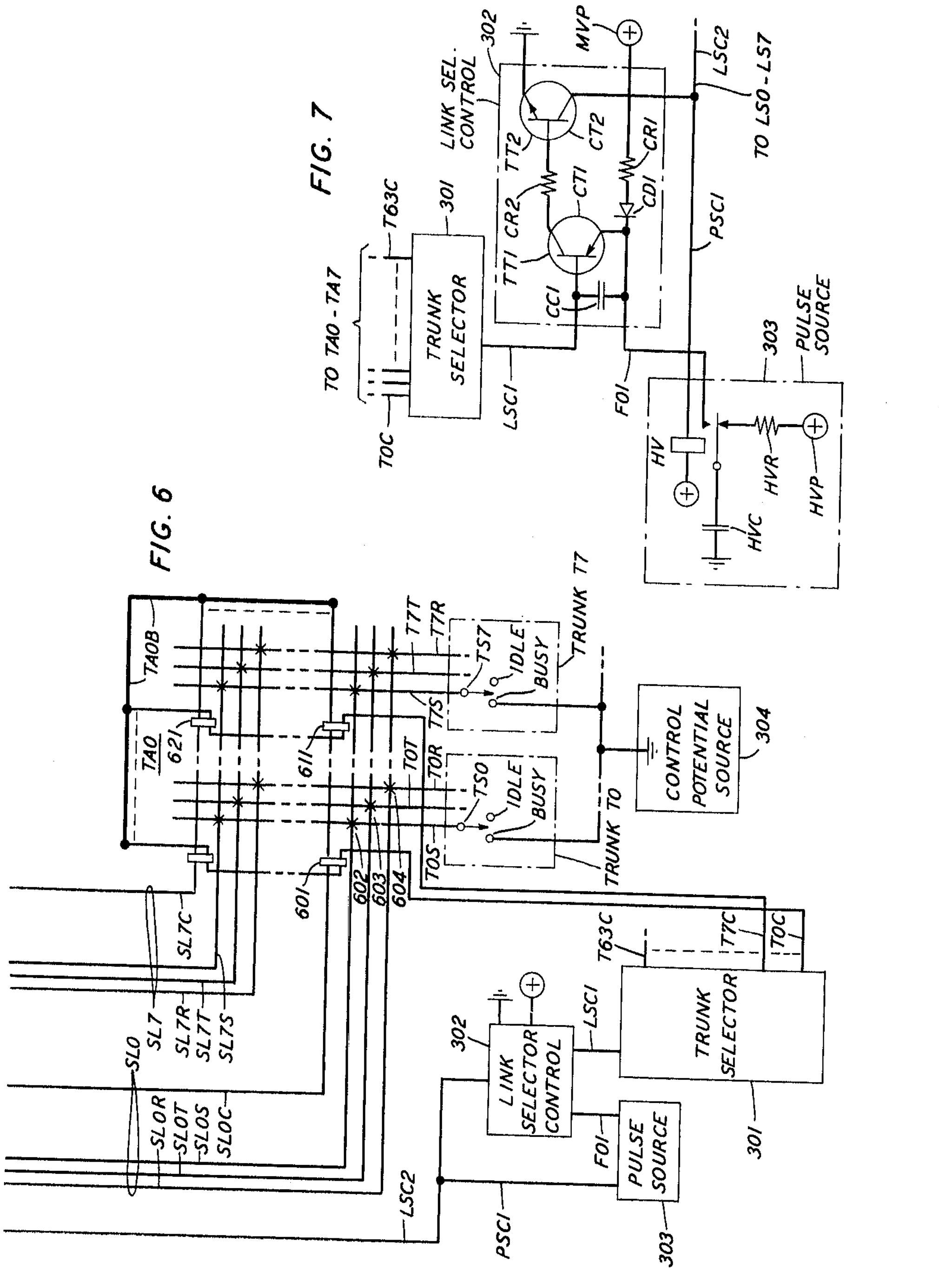
FIG. 7 is a schematic representation of portions of the control circuity used in selecting and establishing a path through the switching network.

FIGS. 4, 5, and 6 of the drawing show in more detail primary array PA0, secondary arrays SA0 and SA7 and tertiary array TA0. Each ferreed crosspoint device, such as crosspoint 401 (FIG. 4) comprises a differentially wound ferreed having three sets of contacts, such as 402, 403, and 404, associated therewith. As described above, ferreed 401 is operable in response to current flow in control conductor PL0C coincident with current flow in control conductor L0C. The contacts 402, 403, and 404 which are controlled by ferreed 401 serve to connect signaling conductor L0S to signaling conductor PL0S and transmission conductors L0T and L0R to transmission conductors PL0T and PL0R, respectively. Primary array PA0 (FIG. 4) comprises one hundred ninety-two ferreed crosspoint devices arranged in coordinate array so that each device defines a connection between one of the lines L0–L23 and one of the primary links PLC0–PLC7.

Tertiary array TA0 (FIG. 6) comprises sixty-four ferreed crosspoints arranged in coordinate array so that each crosspoint defines a connection between one of the trunks T0–T7 and one of the secondary links SL0–SL7. Ferreed 601 of tertiary array TA0 will become enabled in response to current flow in control conductor T0C coincident with current flow in control conductor SL0C. The contacts 602, 603, and 604 which are controlled by ferreed 601, serve to connect signaling conductor T0S to signaling conductor SL0S and transmission conductors T0T and T0R to transmission conductors SL0T and SL0R, respectively, when ferreed 601 is enabled.

Secondary array SA0 (FIG. 5) comprises sixty-four ferreed crosspoints each having three sets of contacts associated therewith. Crosspoint 501 will become enabled in response to current flow in control conductor SL0C coincident with current flow in control conductor PL0C. The contacts 502, 503, and 504, which are controlled by ferreed 501, serve to connect signaling conductor SL0S to signaling conductor PL0S and transmission conductors SL0T and SL0R to transmission conductors PL0T and PL0R respectively, when crosspoint 501 is enabled.

Primary link PL0 includes a primary link control circuit PLC0 (FIG. 4). The function of primary link control circuit PLC0 is to provide an effective open circuit in control conductor PL0C when the transmission conductors PL0T and PL0R of primary link PL0 are in use. Primary link control circuit PLC0 comprises a three terminal device PT0, which may advantageously be a silicon controlled rectifier device, having its anode and cathode connected in series with control conductor PL0C and its gate terminal connected to signaling conductor PL0S. When positive battery marking potential is applied to control conductor PL0C, it is extended through resistor PR0 to signaling conductor PL0S. This positive battery marking potential applied to the anode and gate elements of rectifier PT0 causes rectifier PT0 to assume its conductive or closed circuit state in response to the application of marking ground potential to its cathode, thereby producing current flow in control conductor PL0C. When a link control ground potential is applied to signaling conductor PL0S, rectifier PT0 is inhibited from becoming conductive due to the ground potential applied to the gate terminal thereof. A more detailed description of the operating characteristics of a silicon controlled rectifier is contained in the second edition of Silicon Controlled Rectifier Manual as published by the General Electric Company in 1961. When rectifier PT0 is thus inhibited from becoming conductive, an effective open circuit is produced in control conductor PL0C and no current will flow therein.

Each of the other primary links PL1–PL7 includes a primary link control circuit, PLC1–PLC7 respectively, similar to primary link control circuit PLC0.

Each secondary link SL0–SL7, includes a secondary link control circuit, SLC0–SLC7 respectively. The secondary link control circuits, SLC0–SLC7 are similar to primary link control circuits PLC0–PLC7 and function in the same manner as previously described. For example, silicon controlled rectifier ST0 of secondary link control circuit SLC0 will assume its conductive state in response to marking potentials due to the application of positive battery marking potential from control conductor SL0C through resistor SR0 and signaling conductor SL0S to the gate terminal of rectifier ST0. Application of link control ground potential to signaling conductor SL0S inhibits rectifier ST0 from becoming conductive, thereby providing an effective open circuit in control conductor SL0C.

It may be noted at this point that, although a silicon controlled rectifier has been described for advantageous use in the link control circuits PLC0–PLC7 and SLC0–SLC7, other types of controlled rectifiers and gate circuits may be used to perform the same functions. The design of such control circuits is well within the ability of one skilled in the art.

As previously described, the criterion of coincident current flow through the differential windings of a particular ferreed crosspoint device is satisfied by means of a common bus which interconnects the control conductors of all inputs and outputs of the particular array. Primary arrays PA0–PA7 and tertiary arrays TA0–TA7 have continuous common buses, PA0B–PA7B and TA0B–TA7B respectively. Secondary arrays SA0–SA7 include link selection circuits LS0–LS7 in series with their associated common buses SA0B–SA7B. The function of the link selection circuits LS0–LS7 is to sequentially test the electrical continuity of the primary and secondary links of which the eight possible paths between a selected line and a selected trunk are comprised, and to select one of the available paths for use. A more complete description of the scanning operation of the link selection circuits LS0–LS7 is included hereinbelow.

*Link selection*

The establishment of a communications connection through the network will now be described with reference to FIGS. 4, 5, and 6. It is assumed that a connection is desired between line L0 and trunk T0. Marking ground potential is applied by line selector 201 to control conductor L0C which is associated with line L0. Marking positive battery potential is applied through link selector control 302, conductor LSC1 and trunk selector 301 to control conductor T0C which is associated with trunk T0. It is assumed that the eight possible paths through the network between line L0 and trunk T0 are idle. As previously described, each of the eight possible paths is unique to one of the secondary arrays SA0–SA7.

One of the eight possible paths between line L0 and trunk T0 is defined by ferreed crosspoint 401 in primary array PA0, ferreed crosspoint 501 in secondary array SA0 and ferreed crosspoint 601 in tertiary array TA0. Each of the other seven paths is similarly defined by a ferreed crosspoint in primary array PA0, a ferreed crosspoint in one of the secondary arrays SA1–SA7 and a ferreed crosspoint in tertiary array TA0.

The path defined by crosspoints 401, 501, and 601 may be traced from line selector 201 through control conductor L0C, ferreed crosspoint 401 and other ferreed crosspoints in the same horizontal coordinate of primary array PA0, common bus PA0B of primary array PA0, ferreed crosspoint 401 and other ferreed crosspoints in the same vertical coordinate of primary array PA0, control conductor PL0C including controlled rectifier PT0, ferreed crosspoint 501 and other ferreed crosspoints in the same horizontal coordinate of secondary array SA0, common bus SA0B including resistors LSR0 and R0 in link selection circuit LS0, ferreed crosspoint 501 and other ferreed crosspoints in the same vertical coordinate of secondary array SA0, control conductor SL0C including controlled rectifier ST0, ferreed crosspoint 601 and other ferreed crosspoints in the same horizontal coordinate of tertiary array TA0, common bus TA0B, ferreed crosspoint 601 and other ferreed crosspoints in the same vertical coordinate of tertiary array TA0 and control conductor T0C to trunk selector 301. Each of the other seven paths through the network may be similarly traced.

The above-described application of marking ground and positive battery potentials to control conductors L0C and T0C, respectively, causes controlled rectifiers PT0 and ST0 to assume a conductive state, thereby allowing current to flow in the previously traced path defined by crosspoints 401, 501, and 601. Since all possible paths between line L0 and trunk T0 were assumed to be idle, the controlled rectifiers PT1–PT7 and ST1–ST7, in each of the other paths similarly assume a conductive state responsive to the marking potentials applied to control conductors L0C and T0C. Had one of the possible eight paths been busy, ground control potential applied from the trunk circuit involved in the busy connection would have inhibited the rectifiers of the busy path from assuming a conductive state, thereby inhibiting current flow in the associated control conductors. The current flow produced in the control conductors of the path L0C, SL0C, PL0C, and T0C by the application of marking potentials to control conductors L0C and T0C is of insufficient magnitude to cause ferreed crosspoints 401, 501, and 601 and the crosspoints defining the other possible paths to assume an enabled state.

Each of the link selection circuits LS0–LS7 comprises a resistance-capacitance network having a time-constant differing from the time-contants of the resistance-capacitance networks of the other link selection circuits. These resistance-capacitance networks are arranged in such a manner that the time-constants are of increasing magnitude, with the time-constant of link selection circuit LS0 as the shortest in duration and the time-constant of link selection circuit LS7 as the longest in duration. Current flow in the above-described paths between line L0 and trunk T0 causes each of the eight capacitors C0–C7 to charge through resistances R0–R7, respectively. Due to the shorter time-constant of the resistance-capacitance network comprised of resistor R0 and capacitor C0, capacitor C0 will become fully charged before capacitors C1–C7.

Each of the link selection circuits LS0–LS7 further comprises a controllable rectifier TR0–TR7, the anode and cathode elements of which are connected in series with the associated common bus SA0B–SA7B, and the gate element of which is connected through a zener diode Z0–Z7 to the midpoint of the respective resistance-capacitance networks. Since capacitor C0 is the first of capacitors C0–C7 to become fully charged, the zener diode Z0 will be first of zener diodes Z0–Z7 to reach its threshold and become conductive. Zener diode Z0, in becoming conductive, allows current to flow through the gate element of rectifier TR0. The marking ground and positive battery potentials applied to control conductors L0C and T0C are present upon the cathode and anode elements of rectifier TR0. When current is permitted to flow through the gate element of rectifier TR0 by zener diode Z0, rectifier TR0 assumes a conductive state responsive to the marking potentials applied to its anode and cathode elements. The resistance offered by rectifier TR0 in its conductive state is considerably less than that offered by the resistance-capacitance network comprised of resistor R0, capacitor C0 and resistance LSR0. There is, therefore, a substantial increase in current flow through the path defined by ferreed crosspoints 401, 501, and 601 when rectifier TR0 becomes conductive. This increase in current flow is detected by link selector control 302 which then applies ground potential to conductor LSC2. Conductor LSC2 is connected in multiple to the midpoints of the resistance-capacitance networks of each link selection circuit LS0–LS7. A diode D0–D7 is included in series with each leg of conductor LSC2. The application of ground to conductor LSC2 stops the charging of the capacitors C1–C7 of the other link selection circuits LS1–LS7, thereby halting sequential testing of the possible paths between line L0 and trunk T0.

The above-mentioned application of ground to conductor LSC2 also serves as a signal over conductor PSC1 to pulse source 303. Responsive to this signal, pulse source 303 generates a high positive voltage crosspoint enabling signal and applies the crosspoint enabling signal to conductor F01. The crosspoint enabling signal is extended through the path defined by crosspoints 401, 501, and 601 and through line selector 201 to the marking ground potential applied by line selector 201. The current flow produced by the crosspoint enabling signal in this path causes ferreed crosspoints 401, 501, and 601 to assume an enabled state. As previously described, contacts 402, 502, and 602 close when their associated ferreeds 401, 501, and 601 assume an enabled state and interconnect signaling conductors L0S, PL0S, SL0S, and T0S, all of which are associated with the path defined by crosspoints 401, 501, and 601.

The possibility of causing an undesired ferreed crosspoint device to falsely assume an enabled state responsive to the crosspoint enabling signal is eliminated by the unidirectional current characteristics of the link control circuit rectifiers, such as rectifiers PT0–PT7 and ST0–ST7. Circuits other than the desired eight paths between line L0 and trunk T0 in which current flow could be produced responsive to a coincident application of marking ground potential to control conductor L0C and of a crosspoint enabling signal to control conductor T0C are called "sneak paths." All the possible sneak paths through the network necessarily extend from one switching stage to a subsequent switching stage and return to the original switching stage before completing a circuit through the network. One example of a sneak path, referring to FIGS. 1, 2, and 3, exists from control conductor T0C through tertiary array TA0, secondary link SL7 including link control circuit SLC7, secondary array SA7, secondary link SL63 including link control circuit SLC63, tertiary array TA7, secondary link SL56 including link control circuit SLC56, secondary array SA0, primary link PL0 including link control circuit PLC0 and primary array PA0 to control conductor L0C. The controlled rectifiers in link control circuits SLC7, SLC56, SLC63, and PLC0 permit current flow through their associated control conductors in one direction only. The rectifier in link control circuit SLC63 will not permit current to flow in a reverse direction through the control conductor SL63C of secondary link SL63 from secondary array SA7 to tertiary array TA7. Therefore, no current will flow through the above traced sneak path and false enablement of crosspoint devices other than those defining the selected path is prevented.

Busy-idle switch TS0 in trunk T0 has assumed its operated or busy condition since trunk T0 is engaged and is unavailable for inclusion in other connections. As previously described, link control ground potential is applied by busy-idle switch TS0 to signaling conductor T0S. This control ground potential is extended through contact 602, signaling conductor SL0S, contact 502, signaling conductor PL0S, contact 402 and signaling conductor L0S. Control ground potential is thereby applied through resistors SGR0 and PGR0 to the gate elements of controlled rectifiers ST0 and PT0, respectively. This application of ground potential to the gate elements of the controlled rectifiers ST0 and PT0 inhibits them from assuming a conductive state in response to any subsequent application of marking potentials to their respective anodes and cathodes as previously described.

Upon the above-described establishment of the connection between trunk T0 and line L0, the marking potentials applied to control conductors L0C and T0C are removed by line selector 201 and trunk selector 301, respectively.

Transmission conductors L0R and L0T are extended through the network by contacts 403 and 404, 503 and 504, and 603 and 604, respectively, to transmission conductors T0T and T0R associated with trunk T0. The transmisison and signaling connection between line L0 and trunk T0 is maintained until crosspoints 401, 501, and 601 assume a disabled state.

It is now assumed that another connection is desired between line L23 and trunk T7. The possible paths between line L23 and trunk T7 are similar to the previously described possible paths between line L0 and trunk T0 in that they include primary links PL0–PL7 and secondary lines SL0–SL7. However, the paths between line L23 and trunk T7 are defined by different crosspoints than those defining the paths between line L0 and trunk T0. One such path is defined by crosspoints 411, 501, and 611 and another such path is defined by crosspoints 421, 521, and 621.

Marking ground potential is applied by line selector 201 to control conductor L23C associated with line L23. Marking positive battery potential is applied through trunk selector 301 to control conductor T7C associated with trunk T7. In a manner similar to that described for the connection between line L0 and trunk T0, the controlled rectifiers ST1–ST7 of secondary links SL1–SL7 and the controlled rectifiers PT1–PT7 of primary links PL1–PL7 assume a conductive state responsive to the application of marking potentials to control conductors L23C and T7C. However, due to the control ground potential applied by busy-idle switch TS0 of trunk T0 through signaling conductor T0S, contact 602, signaling conductor SL0S, contact 502 and signaling conductor PL0S to the gate elements of controlled rectifiers ST0 and PT0, controlled rectifiers ST0 and PT0 are inhibited from assuming a conductive state. Due to the inhibiting of the rectifiers PT0 and ST0, no current is permitted to flow through the path between line L23 and trunk T7 which is defined by crosspoints 411, 501, and 611. In the absence of current flow through this path, capacitor C0 in link selection circuit LS0 does not charge, and controlled rectifier TR0 cannot assume a conductive state. Primary link PL0 and secondary link SL0 are therefore excluded from selection for inclusion in a connection between line L23 and trunk T7.

In a manner similar to the selection of a path between line L0 and trunk T0, the link selection circuits LS1–LS7 select a path between line L23 and trunk T7. The first of capacitors C1–C7 to become fully charged causes the associated zener diode Z1–Z7 to conduct, thereby producing current flow in the gate element of the associated controlled rectifier TR1–TR7 and producing an increase in current through the control conductors included in the path. The increased current is detected by link selector control 302; a ground potential is applied to conductor LSC2 to stop all other capacitors from charging; pulse source 303 is signaled to generate a crosspoint enabling signal; and the crosspoints defining the selected path assume a conductive state in response to the application of the crosspoint enabling signal to control conductor T7C.

*Disconnection*

When the transfer of information over the transmission conductors of the connection between line L0 and trunk T0 is completed, busy-idle switch TS0 in trunk T0 is returned to its idle position, thereby removing the control ground potential from signaling conductor T0S. The removal of ground potential from signaling conductor T0S also removes ground potential from signaling conductors SL0S and PL0S of secondary link SL0 and primary link PL0, respectively. The resulting removal of ground potential from the gate elements of controlled rectifiers ST0 and PT0 places them back in their noninhibited condition, wherein an application of marking potentials to their respective anode and cathode elements will cause them to assume a conductive state.

It is now assumed for illustrative purposes that busy-idle switch TS0 was returned to its idle position before the above-described connection between line L23 and trunk T7 was established. As preivously described, marking ground potential is applied through line selector 201 to control conductor L23C and marking positive battery potential is applied through trunk selector 301 to control conductor T7C. Since the control ground potential has now been removed from the signaling conductors SL0S and PL0S, controlled rectifiers ST0 and PT0 will assume a conductive state in response to the application of the marking potentials to control conductors T7C and L23C. The path between line L23 and trunk T7 defined by crosspoints 611, 501, and 411 is now available. Since this path includes link select circuit LS0 whose resistance-capacitance network has the shortest time-constant, it will now be the path selected for connecting line L23 to trunk T7. Upon the selection of this path, as previously described, a crosspoint enabling signal is generated by pulse source 303 and applied through link select control 302 and trunk selector 301 to control conductor T7C. The crosspoint enabling signal is extended through control conductor T7C, ferreed crosspoint 611 and other ferreed crosspoints in the same vertical coordinate, common bus TA0B, ferreed crosspoints 611 and 601 and other crosspoints in the same horizontal coordinate, control conductor SL0C including controlled rectifier ST0, ferreed crosspoint 501, common bus SA0B including controlled rectifier TR0, ferreed crosspoint 501 and other ferreed crosspoints in the same horizontal coordinate, control conductor PL0C including rectifier PT0, ferreed crosspoints 401 and 411 and other crosspoints in the same vertical coordinate, common bus PA0B, ferreed crosspoint 411 and other crosspoints in the same horizontal coordinate, control conductor L23C and line selector 201 to the applied marking ground potential. Ferreed crosspoints 411 and 611 assume an enabled state responsive to the application of the crosspoint enabling signal. Crosspoint 501 is already in an enabled state and therefore remains in that state.

As described in the aforementioned Hayward application, a differentially wound ferreed in its enabled state will return to a disabled state responsive to a pulse applied through the ferreed device in only one coordinate direction. Crosspoints 401 and 601 were in an enabled state when the crosspoint enabling signal was applied. As described above, the path of the crosspoint enabling signal passes through crosspoints 401 and 601 in only a single coordinate direction. Crosspoints 401 and 601 therefore assume a disabled state in response to the application of the crosspoint enabling signal, and the contacts 402, 403, and 404 and 602, 603, and 604 are opened. The connection between line L0 and trunk T0 is therefore broken in response to the same crosspoint enabling pulse which was applied to establish the connection between line L23 and trunk T7.

*Control circuits*

An illustrative circuit arrangement suitable for controlling the establishment of connections through the network is shown in FIG. 7. Its operation will be briefly described with reference to the above description of the establishment of connections through the network.

Marking positive battery potential is provided by source MVP and is applied through resistor CR1, diode CD1, the emitter element of transistor TT1 and the base element of transistor TT1 to conductor LSC1. Capacitor CC1 is provided to prevent undesirable current surges through transistor TT1. Trunk selector 301 applies the marking positive battery potential present on conductor LSC1 to a selected one of control conductors T0C–T63C.

As previously described, a marking ground potential is applied by line selector circuit 201 to a selected control conductor L0C–L191C and current flows in the control conductors through the network. Selection of one of the eight possible paths through the network is made as previously described, and the current flow in the control conductors of the selected path is increased when the appropriate rectifier TR0–TR7 assumes a conductive state. Transistor TT1 is responsive to the increase in current flow through its base element to produce current flow through its emitter element, resistor CR2, the base element of transistor TT2 and the emitter element of transistor TT2 to ground. The current flow through the base element of transistor TT2 is sufficient to produce current flow between the emitter and collector elements of transistor TT2. A circuit is therefore completed from ground through transistor TT2 and conductor LSC2, over which circuit the control ground potential is applied to the midpoint of the resistance-capacitance networks in link selection circuits LS0–LS7, thereby halting the above-described scanning of possible paths through the network.

Ground potential is also applied through transistor TT2 to conductor PSC1 and through the winding of relay HV to positive battery. High voltage relay HV operates over this circuit. High voltage source HVP is normally connected through resistance HVR, a break contact of relay HV and capacitor HVC to ground, thereby producing a high voltage charge in capacitor HVC. When relay HV operates as described, the high voltage charge on capacitor HVC is applied through a make contact of relay HV to conductor F01 and through transistor TT1, conductor LSC1 and trunk selector circuit 301 to the selected control conductor T0C–T63C. The high voltage charge on capacitor HVC, when applied as described to the selected control conductor T0C–T63C, is the crosspoint enabling signal which is sufficient to operate the ferreed crosspoints defining a selected path through the network.

When trunk selector 301 and line selector 201 remove the marking potentials from the selected control conductors T0C–T63C and L0C–L191C respectively, the transistors TT1 and TT2 in link select control 302 return to their normal nonconducting state and the relay HV releases. The release of relay HV causes high voltage potential from source HVP to be again connected through capacitor HVC to ground, thereby preparing pulse source 303 to generate another crosspoint enabling signal when required.

It is to be understood that the above-described arrangements are merely illustrative of the application of the principles of the invention. Numerous other arrangements utilizing other crosspoint devices and scanning and control circuitry may be devised by those skilled in the art without departing from the spirit and scope of the invention.

What is claimed is:

1. A switching network comprising an input terminal, an output terminal; a path between said input terminal and said output terminal; a plurality of crosspoint devices defining said path; each of said crosspoint devices comprising crosspoint enabling means and connecting means; a first signaling conductor associated with said output terminal; second signaling conductors associated with said path; said connecting means controlled by said crosspoint enabling means to interconnect said first signaling conductor and said second signaling conductors; said path comprising a control conductor having said crosspoint enabling means in series therewith, and controllable rectifiers interposed between said crosspoint enabling means, each of said rectifiers having its anode and cathode elements connected in series with said control conductor and its gate element connected to one of said second signaling conductors.

2. A switching network in accordance with claim 1 wherein each of said crosspoint devices comprises a differentially wound ferreed.

3. A switching network comprising an input terminal; an output terminal; marking means for applying marking potentials to said input terminal and to said output terminal; a plurality of paths between said input terminal and said output terminal defined by crosspoint devices; idle path selecting means comprising said plurality of paths, scanning means for sequentially determining from each of said plurality of paths the electrical continuity thereof, detection means responsive to a determination by said scanning means that one of said plurality of paths is electrically continuous for disabling said scanning means, and pulsing means controlled by said detection means for applying a crosspoint enabling signal to said output terminal.

4. A switching network comprising an input terminal; an output terminal; a signaling conductor associated with said output terminal; marking means for applying marking potentials to said input terminal and to said output terminal; crosspoint devices defining paths between said input terminal and said output terminal, each of said crosspoint devices comprising crosspoint enabling means and connecting means; idle path selection means including said paths and responsive to said marking means for selecting an idle one of said paths; pulsing means controlled by said idle path selection means for enabling said crosspoint enabling means of those of said crosspoint devices which define said selected idle path; said connecting means responsive to said crosspoint enabling means for extending said signal conductor through said network in association with said selected path; means for applying a control potential to said signaling conductor; and control means associated wtih said selected path and responsive to said control potential to exclude said selected path from said idle path selection means.

5. A switching network comprising an input terminal having a first signaling conductor associated therewith; an output terminal having a second signaling conductor associated therewith; marking means for applying marking potentials to said input terminal and to said output terminal; crosspoint devices defining paths between said input terminal and said output terminal; selection means including all idle ones of said paths and responsive to said marking means for selecting an idle one of said paths; each of said crosspoint devices comprising crosspoint enabling means and connecting means; pulsing means controlled by said selection means for enabling said crosspoint enabling means of those of said crosspoint devices which define said selected idle one of said paths, said connecting means responsive to said crosspoint enabling means to interconnect said first signaling conductor and said second signaling conductor; means for applying control potential to said second signaling conductor; and control means associated with said connecting means and responsive to said application of control potential to said second signaling conductor to exclude said selected idle one of said paths from said selection means.

6. A switching network comprising an input terminal; an output terminal; paths between said input terminal and said output terminal; crosspoint devices defining said paths, each of said paths comprising links interconnectable by said crosspoint devices; each of said links comprising a control conductor, a signaling conductor and a controllable rectifier having its anode and cathode elements connected in series with said control conductor and its gate element connected to said signaling conductor; each of said crosspoint devices comprising crosspoint enabling means connected in series with the control conductors of the particular links which are interconnectable by a crosspoint device and connecting means responsive to said crosspoint enabling means to interconnect the signaling conductors of said particular links; said rectifier responsive to marking potentials applied to the distal ends of said control conductor to produce current flow through said control conductor and controlled by a continuous control potential applied to said signaling conductor to inhibit current flow responsive to subsequently applied marking potentials.

7. A switching network comprising an input terminal; an output terminal; paths between said input terminal and said output terminal; a first signaling conductor associated with said output terminal; second signaling conductors individually associated with each of said paths; crosspoint devices each of which defines one of said paths and which comprises crosspoint enabling means connected in series with said defined path and connecting means responsive to said enabling means for connecting said first signaling conductor to the one of said second signaling conductors associated with said defined path; marking means for applying marking potentials to said input terminal and to said output terminal; idle path selecting means responsive to said marking means and comprising scanning means for sequentially determining the electrical continuity of each of said paths, detection means responsive to a determination by said scanning means that one of said paths is electrically continuous for disabling said scanning means, and pulsing means controlled by said detection means for applying a crosspoint enabling signal to said output terminal; and switching means individually associated with each of said paths and responsive to a continuous control potential applied to said first signaling conductor to effect an open circuit in said defined path.

8. A switching network comprising an input terminal; an output terminal; a path between said input terminal and said output terminal defined by a first crosspoint device in a first switching stage, a second crosspoint device in an intermediate switching stage and a last crosspoint device in a last switching stage; each of said crosspoint devices comprising crosspoint enabling means and connecting means; said path comprising a control conductor having said enabling means of said first, second, and last crosspoint devices in series therewith; a first link comprising a first segment of said control conductor defined by said first and second crosspoint devices, a first signaling conductor and a first controllable rectifier having its anode and cathode elements in series with said first segment of said control conductor and its gate element connected to said first signaling conductor; a second link comprising a second segment of said control conductor defined by said second and last crosspoint devices, a second signaling conductor and a second controllable rectifier having its anode and cathode elements in series with said second segment of said control conductor and its gate element connected to said second signaling conductor; said first and second rectifiers conductive in response to marking potentials applied to said input terminal and to said output terminal; said crosspoint enabling means enabled by a crosspoint enabling signal applied to said output terminal coincident with a marking potential applied to said input terminal when said rectifiers are conductive; a third signaling conductor associated with said output terminal; said connecting means responsive to said enabled crosspoint enabling means to interconnect said first, second, and third signaling conductors; said rectifiers controlled by a continuous control potential applied to said third signaling conductor to inhibit conduction through said first and second rectifiers in response to subsequent applications of marking potentials and crosspoint enabling signals to said terminals.

9. In a switching network a crosspoint device comprising crosspoint enabling means and connecting means; and control means for controlling said crosspoint device comprising a control conductor having said crosspoint enabling means in series therewith, a first signaling conductor and a second signaling conductor both of which are associated with said crosspoint device, said connecting means responsive to said enabling means for connecting said first signaling conductor to said second signaling conductor, and switching means connected in series with said control conductor and responsive to marking potentials applied thereto to produce current flow through said control conductor and responsive to a control potential applied through said first signaling conductor and said connecting means to said second signaling conductor to inhibit current flow through said control conductor.

10. In a switching network the combination described in claim 9 wherein said crosspoint device comprises a differentially wound ferreed.

11. In a switching network a crosspoint device comprising crosspoint enabling means and connecting means controlled by said crosspoint enabling means; means for controlling said crosspoint device comprising a control conductor having said crosspoint enabling means in series therewith for applying crosspoint enabling signals and for extending marking potentials applied thereto through said network, a first signaling conductor and a second signaling conductor both of which are associated with said crosspoint device, said connecting means responsive to said crosspoint enabling means to connect said first signaling conductor to said second signaling conductor, and a controllable rectifier having its anode and cathode elements connected in series with said control conductor and its gate element connected to said second signaling conductor; said rectifier responsive to said marking potentials applied to said control conductor to produce current flow through said control conductor and controlled by a control potential applied through said first signaling conductor and said connecting means to said second signaling conductor to inhibit current flow through said control conductor responsive to said marking potentials.

12. In a switching network a crosspoint device comprising crosspoint enabling means controllable in a first manner to assume an enabled state responsive to an application of a crosspoint enabling signal and controllable in a second manner to assume a disabled state responsive to a subsequent application of a crosspoint enabling signal; and control means for controlling said applications of said crosspoint enabling signals comprising a control conductor having said crosspoint enabling means in series therewith for applying said crosspoint enabling signals, a signaling conductor associated with said crosspoint device, and switching means connected in series with said control conductor and responsive to a control potential applied to said signaling conductor to inhibit said applications of said crosspoint enabling signals through said crosspoint enabling means.

13. In a switching network the combination described in claim 12 wherein said crosspoint device comprises a differentially wound ferreed.

14. In a switching network a crosspoint device comprising crosspoint enabling means controllable in a first manner to assume an enabled state responsive to an application of a crosspoint enabling signal and controllable in a second manner to assume a disabled state responsive to a subsequent application of a crosspoint enabling signal and connecting means controlled by said crosspoint enabling means; and control means for controlling said applications of said crosspoint enabling signals comprising a control conductor having said crosspoint enabling means in series therewith for applying said crosspoint enabling signals and for extending marking potentials applied thereto through said network, a first signaling conductor and a second signaling conductor both of which are associated with said crosspoint device, said connecting means responsive to said crosspoint enabling means in said enabled state to connect said first signaling conductor to said second signaling conductor, a controllable rectifier having its anode and cathode elements connected in series with said control conductor and its gate element connected to said second signaling conductor, said rectifier responsive to said marking potentials to permit application of said crosspoint enabling signals through said crosspoint enabling means and controlled by a control potention applied through said first signaling conductors and said connecting means to said second signaling conductors to inhibit application of said crosspoint enabling signals through said crosspoint enabling means.

15. A switching network comprising an array of ferreed switches each including first and second winding means and a plurality of contact means, a first common bus to which all of said ferreed switch first winding means are connected, a second common bus to which all of said ferreed switch second winding means are connected, gating means interconnecting said first common bus and said second common bus, said gating means including a control terminal, and charging means in parallel with said gating means and connected to the control terminal thereof.

16. A switching network comprising an array of ferreed switches each including first and second winding means and a plurality of contact means, a first common bus to which all of said ferreed switch first winding means are connected, a second common bus to which all of said ferreed switch second winding means are connected, a silicon controlled rectifier gating element interconnecting said first common bus and said second common bus, said silicon controlled rectifier having anode, cathode and gate terminals, said anode terminal of said rectifier being connected to said first common bus and said cathode terminal of said rectifier being connected to said second common bus, a charging circuit comprising a series resistor and capacitor in parallel with said silicon controlled rectifier to interconnect said first common bus and said second common bus, and a voltage threshold element connected between the junction of said series connected resistor and capacitor and the gate terminal of said silicon controlled rectifier.

17. A switching network in accordance with claim 16 wherein said voltage responsive element comprises a zener diode.

18. In a switching network, a crosspoint device comprising crosspoint enabling and connecting means controlled by said crosspoint enabling means; means for controlling said crosspoint device comprising a control conductor having said crosspoint enabling means in series therewith, a signaling conductor associated with said crosspoint device, a controllable rectifier having its anode and cathode elements connected in series with said control conductor and its gate element connected to said signalling conductor, means including said control conductor for applying marking potentials to said rectifier to complete a current path through said control conductor, means for applying a crosspoint enabling signal through said marked current path to said crosspoint enabling means, and said rectifier responsive to a control potential applied to said signaling conductor to open said current path.

19. In a switching network, a crosspoint switch device comprising a ferreed switch having a pair of windings and a plurality of contact means, means for connecting said windings in series, a signaling conductor connected to one of said contact means, a control conductor connected to one of said windings, and three-terminal rectifier means having its input and output terminals connected in series with said control conductor and its gating terminal connected to said signaling conductor.

References Cited by the Examiner

UNITED STATES PATENTS

| | | | |
|---|---|---|---|
| 2,291,752 | 8/1942 | Parker | 179—18 |
| 2,578,701 | 12/1951 | Hecht | 179—18 |
| 2,901,547 | 8/1959 | Miloche | 179—18 |
| 3,055,982 | 9/1962 | Kowalik | 179—18 |
| 3,110,772 | 11/1963 | Hayward | 179—27.54 |

ROBERT H. ROSE, *Primary Examiner.*